US012785185B2

(12) United States Patent
Kim et al.

(10) Patent No.: US 12,785,185 B2
(45) Date of Patent: Nov. 3, 2026

(54) SECONDARY BATTERY AND METHOD FOR MANUFACTURING THE SAME

(71) Applicant: LG Energy Solution, Ltd., Seoul (KR)

(72) Inventors: Shin Chul Kim, Daejeon (KR); Seung Ho Na, Daejeon (KR); Sung Chul Park, Daejeon (KR)

(73) Assignee: LG Energy Solution, Ltd., Seoul (KR)

(*) Notice: Subject to any disclaimer, the term of this patent is extended or adjusted under 35 U.S.C. 154(b) by 672 days.

(21) Appl. No.: 18/029,205

(22) PCT Filed: Nov. 17, 2021

(86) PCT No.: PCT/KR2021/016907
§ 371 (c)(1),
(2) Date: Mar. 29, 2023

(87) PCT Pub. No.: WO2022/108335
PCT Pub. Date: May 27, 2022

(65) Prior Publication Data

US 2023/0369690 A1 Nov. 16, 2023

(30) Foreign Application Priority Data

Nov. 18, 2020 (KR) ........................ 10-2020-0154998

(51) Int. Cl.
*H01M 50/178* (2021.01)
*H01M 10/04* (2006.01)
(Continued)

(52) U.S. Cl.
CPC ....... *H01M 50/178* (2021.01); *H01M 10/049* (2013.01); *H01M 50/105* (2021.01); *H01M 50/186* (2021.01); *H01M 50/536* (2021.01)

(58) Field of Classification Search
CPC ............. H01M 50/178; H01M 10/049; H01M 50/105; H01M 50/186; H01M 50/536;
(Continued)

(56) References Cited

U.S. PATENT DOCUMENTS 10,700,324 B2 6/2020 Kim et al.
2009/0081542 A1 3/2009 Yageta et al.
(Continued)

FOREIGN PATENT DOCUMENTS

CN 107710458 A 2/2018
JP 2002151020 A 5/2002
(Continued)

OTHER PUBLICATIONS

Extended European Search Report including Written Opinion for Application No. 21895103.6 dated Apr. 2, 2024, pp. 1-10.
(Continued)

*Primary Examiner* — Matthew T Martin
*Assistant Examiner* — Bartholomew A Hornsby
(74) *Attorney, Agent, or Firm* — Lerner David LLP

(57) ABSTRACT

The present invention provides a secondary battery, in which an electrode assembly is embedded in a pouch, and a lead electrically connected to the electrode assembly has one side protruding to the outside of the pouch, the secondary battery comprising: the pouch in which the electrode assembly is embedded, and sealing is performed along an edge thereof; the lead having one end connected to the electrode assembly and the other end protruding to the outside of the pouch; and a lead film disposed between the lead and the pouch and adhering to each of the pouch and the lead when the sealing of the pouch is performed, wherein an expansion part expanded by a predetermined length along a longitudinal
(Continued)

direction of the lead is formed on the pouch, and the lead film has an area so that the entire expansion part is accommodated therein.

9 Claims, 5 Drawing Sheets

(51) Int. Cl.
*H01M 50/105* (2021.01)
*H01M 50/186* (2021.01)
*H01M 50/536* (2021.01)

(58) Field of Classification Search
CPC .... H01M 50/14; H01M 50/19; H01M 50/198; H01M 50/571; H01M 50/116; H01M 50/10; H01M 50/172; H01M 50/543; H01M 50/183; Y02E 60/10; Y02P 70/50
See application file for complete search history.

(56) References Cited

U.S. PATENT DOCUMENTS

| | | | | |
|---|---|---|---|---|
| 2011/0064991 | A1* | 3/2011 | Ahn | H01M 10/0436 429/176 |
| 2013/0052521 | A1 | 2/2013 | Kim | |
| 2016/0218347 | A1* | 7/2016 | Baek | H01M 50/581 |
| 2018/0062131 | A1 | 3/2018 | Cho et al. | |
| 2020/0287186 | A1 | 9/2020 | Kim et al. | |

FOREIGN PATENT DOCUMENTS

| | | | | | |
|---|---|---|---|---|---|
| JP | 2003168403 | A | | 6/2003 | |
| KR | 20080037868 | A | | 5/2008 | |
| KR | 20110030395 | A | | 3/2011 | |
| KR | 20120063236 | A | | 6/2012 | |
| KR | 101297014 | B1 | | 8/2013 | |
| KR | 101308242 | B1 | * | 9/2013 | H01M 50/105 |
| KR | 20150072236 | A | | 6/2015 | |
| KR | 101671486 | B1 | | 11/2016 | |
| KR | 20160134331 | A | | 11/2016 | |
| KR | 20170013809 | A | * | 2/2017 | H01M 50/124 |
| KR | 20170020996 | A | | 2/2017 | |
| KR | 102053987 | B1 | | 12/2019 | |
| KR | 102051930 | B1 | | 1/2020 | |

OTHER PUBLICATIONS

International Search Report for Application No. PCT/KR2021/016907 mailed Mar. 2, 2022.3 pages.

Search Report dated Aug. 26, 2025 from the Office Action for Chinese Application No. 202180063209.0 issued Aug. 28, 2025, pp. 1-2.

* cited by examiner

SECONDARY BATTERY AND METHOD FOR MANUFACTURING THE SAME

CROSS-REFERENCE TO RELATED APPLICATIONS

The present application is a national stage entry under 35 U.S.C. § 371 of International Application No. PCT/KR2021/016907, filed on Nov. 17, 2021, which claims priority to Korean Patent Application No. 10-2020-0154998, filed on Nov. 18, 2020, the disclosures of which are hereby incorporated by reference herein in their entireties.

TECHNICAL FIELD

The present invention relates to a secondary battery and a method for manufacturing the same, and more particularly, to a secondary battery, in which an expansion part is formed at a portion of a pouch, from which a lead protrudes, to increase in sealing area, thereby improving sealing performance, and a method for manufacturing the same.

BACKGROUND ART

The demand for secondary batteries as energy sources is rapidly increasing in various fields comprising personal portable terminal and electric vehicle fields.

Unlike primary batteries, rechargeable secondary batteries are being developed not only for digital devices but also for vehicles such as electric vehicles.

Secondary batteries are variously classified according to materials and external shapes of a positive electrode and a negative electrode. Among them, since such a lithium secondary battery using a lithium compound material has large capacity and a low self-discharge rate, the lithium secondary battery is being widely used instead of a nickel-cadmium secondary battery according to the related art.

Also, the lithium secondary battery may be manufactured in various shapes. Representatively, the lithium secondary battery may be manufactured in a cylinder type, a prismatic type, or a pouch type.

As shown in FIGS. 1*a* and 1*b*, which illustrate states before and after an electrode assembly is mounted on a pouch having a conventional structure, a pouch-type secondary battery comprises a pouch 4 and an electrode assembly 1 embedded in the pouch 4 to charge and discharge electrical energy.

The electrode assembly 1 is configured by alternately stacking a negative electrode and a positive electrode together with a separator therebetween, and electrode tabs 1*a* and 1*b* comprising a negative electrode tab protruding from the negative electrodes and a positive electrode tab protruding from the positive electrodes are welded to leads 2*a* and 2*b* at both sides of the electrode assembly 1, respectively. As illustrated in the drawing, the positive electrode tab and the negative electrode tab may be disposed on sides opposite to each other according to a method for manufacturing the positive electrode and the negative electrode.

In addition, ends of the leads 2*a* and 2*b* protrude out of the pouch 4 so as to be electrically connected to an external device.

The pouch 4 is divided into an upper portion 5 and a lower portion 6, which are capable of accommodating the electrode assembly 1 by covering one side and the other side of the electrode assembly 1 and is provided in a structure in which the upper portion 5 and lower portion 6 are connected to each other at one side.

Recessed grooves 5*a* and 6*a* are formed in the upper portion 5 and the lower portion 6 of the pouch 4 to accommodate the electrode assembly 1, respectively, and each of edges 5*b* and 6*b* of the grooves 5*a* and 6*a* are formed to be flat along a circumference of the pouch 4. Thus, after the electrode assembly 1 is mounted, when the upper portion 5 and the lower portion 6 of the pouch 4 are closed, the edges 5*b* and 6*b* of the upper portion 5 and the lower portion 6 are in contact with each other, and in this state, thermal fusion is performed by applying heat and a pressure to form a sealing part.

Here, when the electrode assembly 1 is mounted, one end of each of the leads 2*a* and 2*b* protrudes out of the pouch 4 to prevent the sealing performance of the pouch 4 from being deteriorated, and simultaneously, lead films 3*a* and 3*b* are mounted in a state of being attached to leads 2*a* and 2*b* so as to secure electrical insulation.

As the secondary battery increases in capacity and is miniaturized, the edges 5*b* and 6*b* forming the sealing part of the pouch 4 tend to be gradually reduced in size. Thus, there is a problem that sealing strength is lowered, and in particular, when the sealing strength is lowered, there is a possibility that electrolyte leakage or the like occurs in the portion from which each of the leads 2*a* and 2*b* protrudes.

DISCLOSURE OF THE INVENTION

Technical Problem

Therefore, a main object of the present invention is to provide a secondary battery capable of increasing in sealing strength of the pouch at a portion, from which a lead protrudes, and a method for manufacturing the same.

Technical Solution

In order to achieve the above-described object, a method for manufacturing a secondary battery, in which an electrode assembly is embedded in a pouch, and a lead electrically connected to the electrode assembly has one side protruding to the outside of the pouch, provided in the present invention comprises: a pouch providing process of providing the pouch, which has an inner space, in which the electrode assembly is embedded, and in which sealing is performed along an edge, wherein an expansion part protrudes from a position at which a lead having one end connected to the electrode assembly and the other end protruding to the outside is seated; and a sealing process of applying heat along an edge of the pouch to seal the pouch in a state in which the electrode assembly and the lead are mounted in the pouch, and the pouch is closed, wherein, in the sealing process, the sealing is performed so that the expansion part is bonded to the lead.

The lead may be mounted together with a lead film, and when the sealing of the expansion part is performed, the expansion part may be thermally fused to the lead film, and the lead film may be thermally fused to a surface of the lead.

The lead film may have an area so that the entire expansion part is accommodated therein. The lead film may have a width greater than that of the lead.

A protruding length of the expansion part from one side of the pouch, in which the expansion part is formed, may be less than 50% of a protruding length of the lead from one side of the pouch, in which the expansion part is formed.

A secondary battery, in which an electrode assembly is embedded in a pouch, and a lead electrically connected to the electrode assembly has one side protruding to the outside of the pouch, and which is manufactured through the manufacturing method, according to the present invention comprises: the pouch in which the electrode assembly is embedded, and sealing is performed along an edge thereof; the lead having one end connected to the electrode assembly and the other end protruding to the outside of the pouch; and a lead film disposed between the lead and the pouch and adhering to each of the pouch and the lead when the sealing of the pouch is performed, wherein an expansion part expanded by a predetermined length along a longitudinal direction of the lead is formed on the pouch, and the lead film has an area so that the entire expansion part is accommodated therein.

The expansion part may be thermally fused to the lead film, and the lead film may be thermally fused to a surface of the lead.

The expansion part may have a width less than or equal to that of the lead, and the lead film may have a width greater than that of the lead.

A protruding length of the expansion part from one side of the pouch, in which the expansion part is formed, may be less than 50% of a protruding length of the lead from one side of the pouch, in which the expansion part is formed.

Advantageous Effects

In the present invention having the configuration as described above, since the expansion part is formed on the pouch, and the sealing area increases by the increasing area by the expansion part, the sealing performance in the portion at which the lead is disposed may be further improved, and thus, the possibility of the leakage of the electrolyte and the possibility of the damage of the lead may be further reduced.

The lead film may be thermally fused to the expansion part and the lead of the pouch. Here, since the lead film has the area and width, which are greater than those of the expansion part, the effect of increasing in width of the sealed point may be expected.

MODE FOR CARRYING OUT THE INVENTION

Figure 1A:
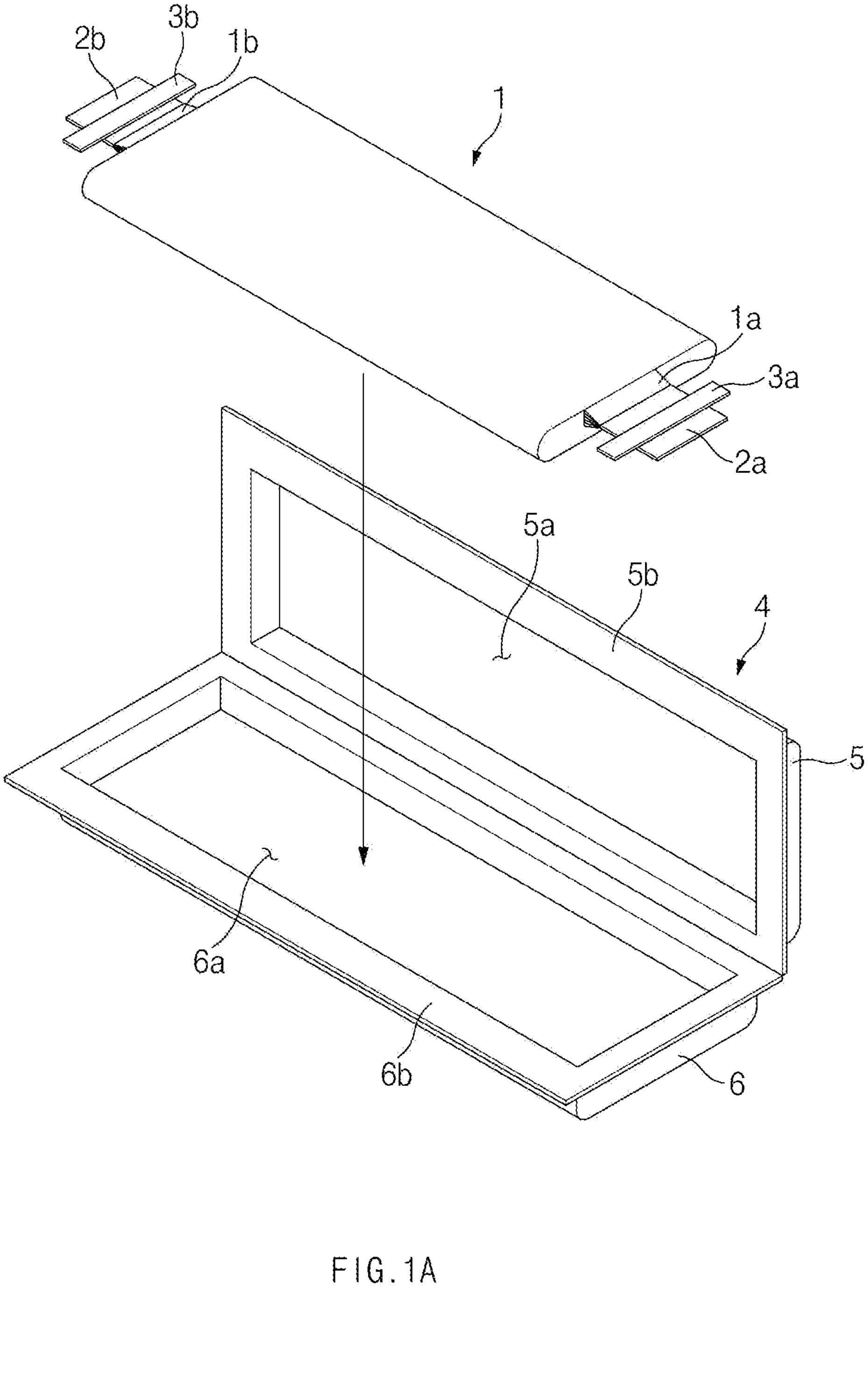
FIG. 1*a* is a view illustrating a state in which an electrode assembly is mounted in a pouch having a conventional structure.
Figure 1B:
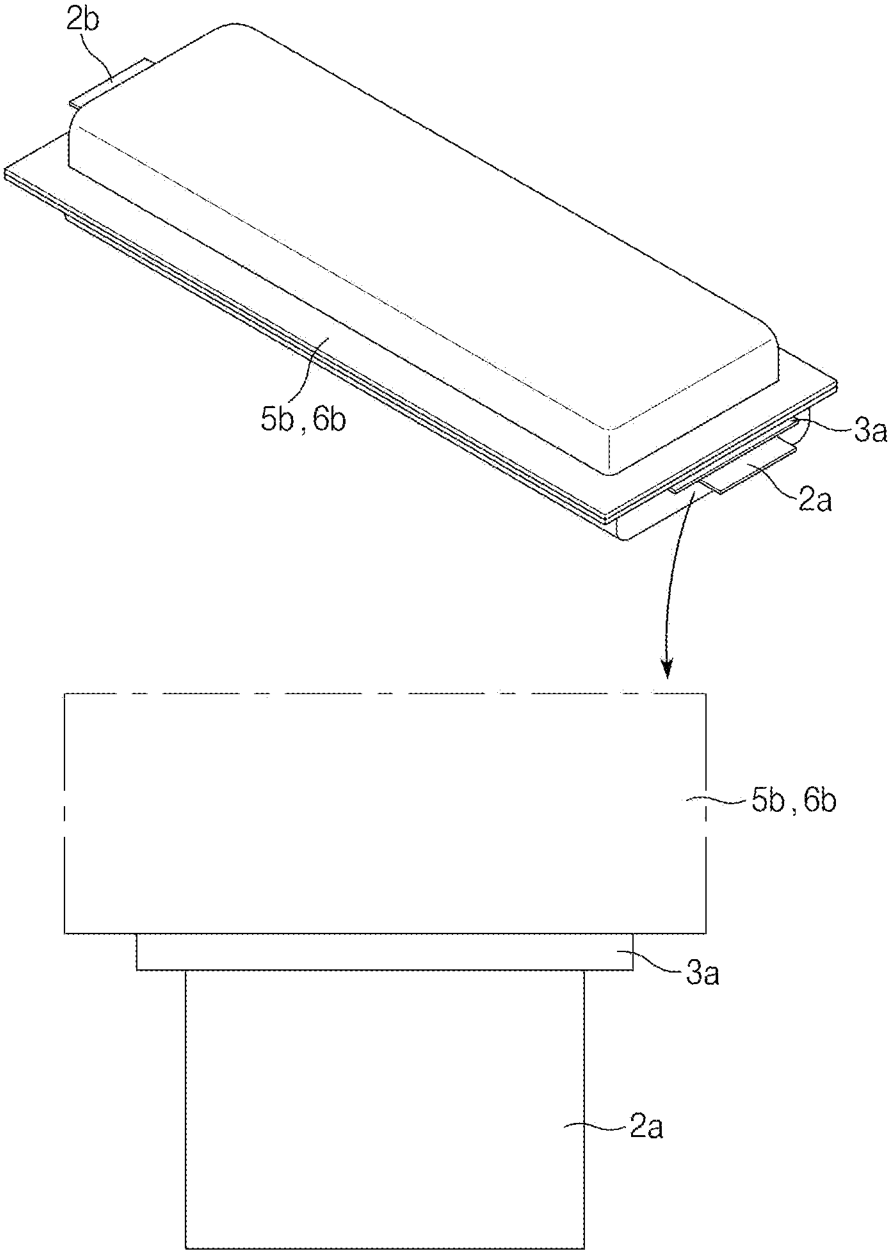
FIG. 1B is a view illustrating a state in which the electrode assembly is mounted in the pouch having the conventional structure, and then, sealing is performed, and is an enlarged view of a region, in which a lead protrudes.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a secondary battery and a method for manufacturing the same, and more particularly, to a secondary battery, in which expansion parts 51*a*, 51*b*, 61*a*, and 61*b* are formed at portions of a pouch 40, from which leads 20*a* and 20*b* protrude, to increase in sealing area, thereby improving sealing performance, and a method for manufacturing the same. Hereinafter, embodiments according to the present invention will be described in more detail with reference to the accompanying drawings.

First Embodiment

Figure 2:
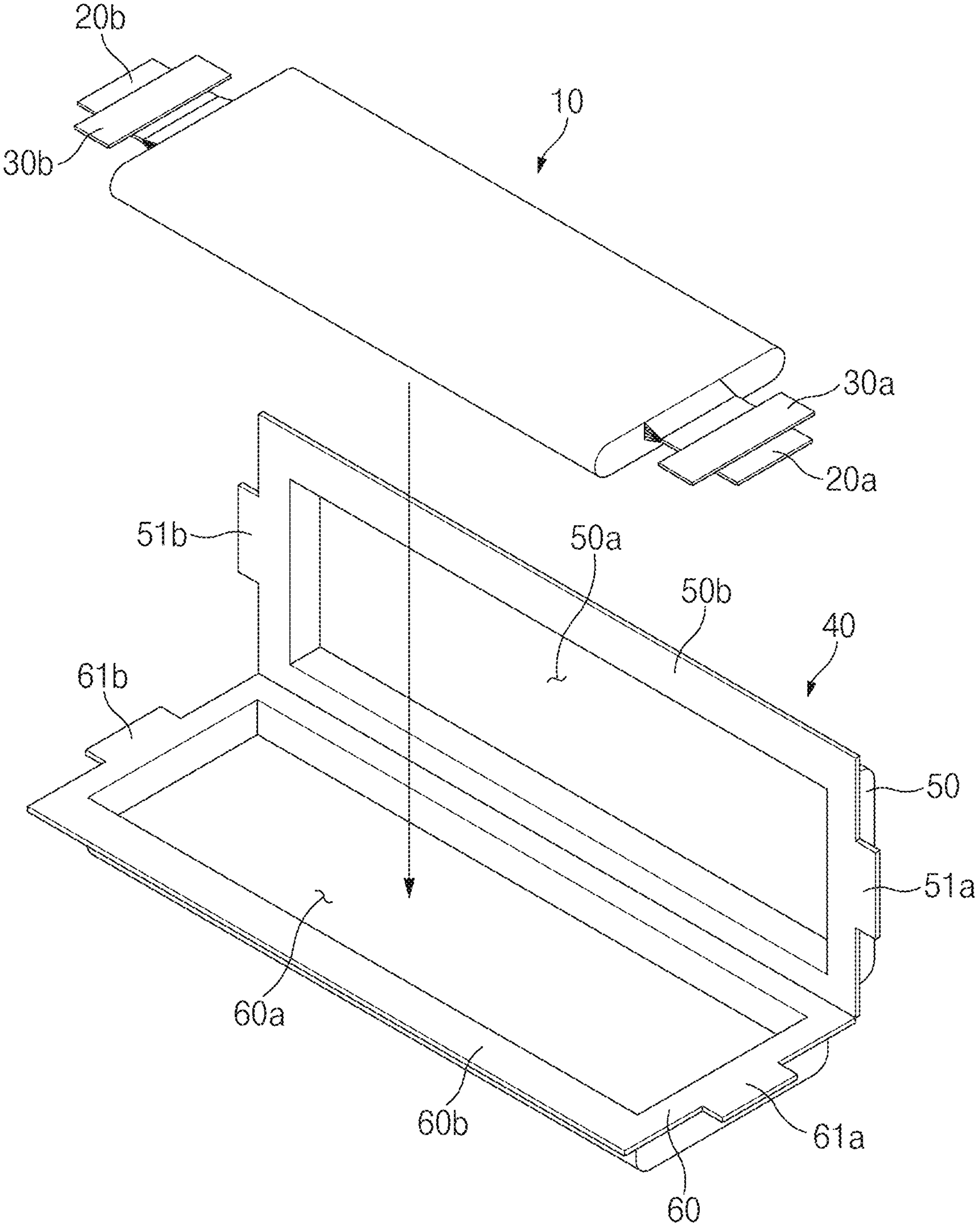
FIG. 2 is a view illustrating a state before an electrode assembly is mounted in a pouch according to the present invention.
Figure 3:
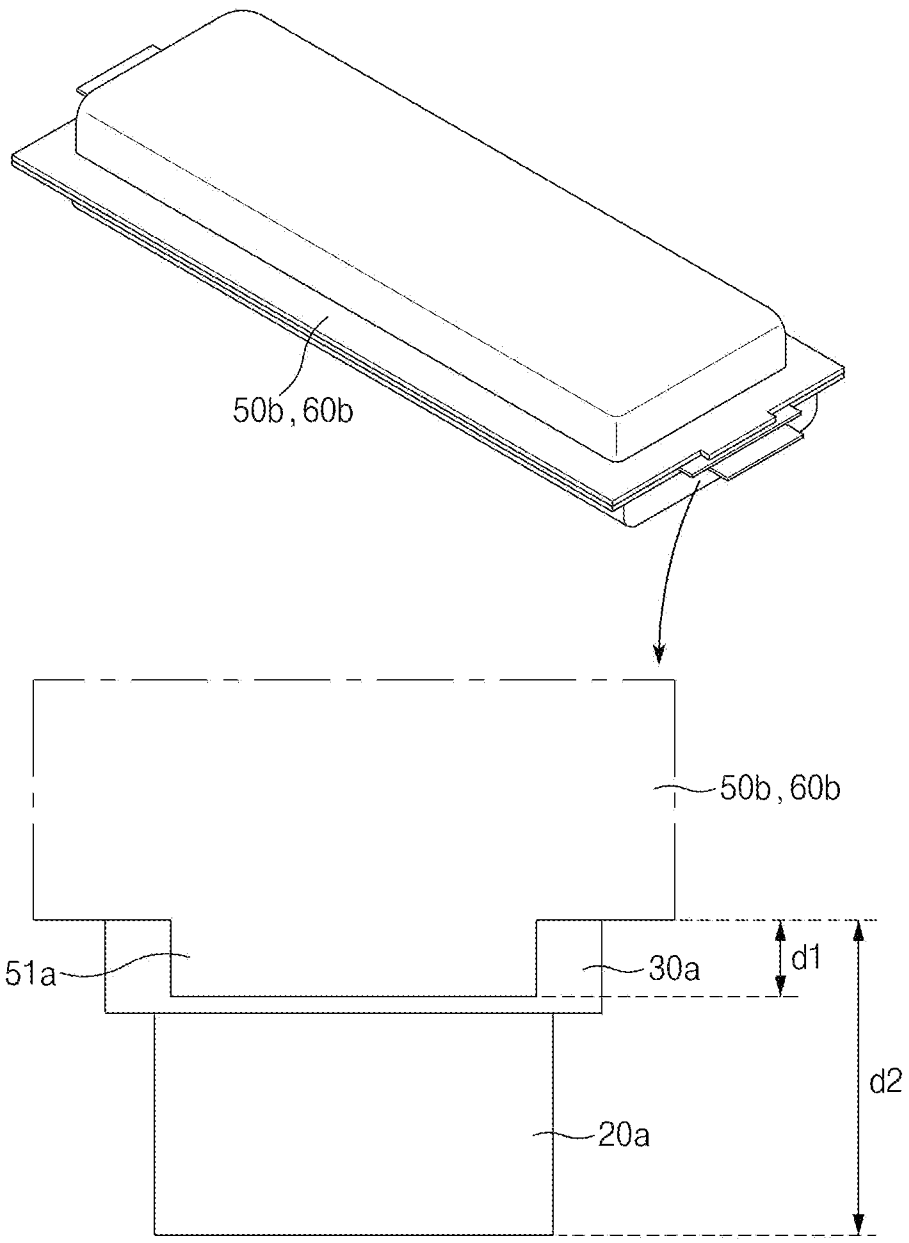
FIG. 3 is a view illustrating a state in which the electrode assembly is mounted in the pouch, and then, sealing is performed according to the present invention, and is an enlarged view of a region, in which a lead protrudes.

FIG. 2 is a view illustrating a state before an electrode assembly is mounted in a pouch according to the present invention, and FIG. 3 is a view illustrating a state in which the electrode assembly is mounted in the pouch, and then, sealing is performed according to the present invention, and is an enlarged view of a region, in which a lead protrudes.

Referring to FIGS. 2 and 3, a secondary battery provided in this embodiment has a structure, in which an electrode assembly 10 is embedded in a pouch 40, and one side of each of leads 20*a* and 20*b* electrically connected to the electrode assembly 10 protrudes to the outside of the pouch 40.

That is, in this embodiment, the secondary battery comprises the electrode assembly 10, the pouch 40 (50 and 60), the leads 20 (20*a* and 20*b*), and lead films 30 (30*a* and 30*b*), the pouches 40 have a structure in which expansion parts 51 and 61 (51*a*, 51*b*, 61*a*, and 61*b*) are formed.

The electrode assembly 10 is configured by alternately stacking a negative electrode and a positive electrode together with a separator therebetween, and a negative electrode tab protruding from the negative electrodes and a positive electrode tab protruding from the positive electrodes are welded to the leads 20*a* and 20*b* at both sides of the electrode assembly 10, respectively.

In addition, ends of the leads 20*a* and 20*b* are mounted in the pouch 40 so as to protrude to the outside of the pouch 40 so that the leads 20*a* and 20*b* are electrically connected to an external device. The pouch 40 is divided into an upper portion 50 and a lower portion 60, which are capable of accommodating the electrode assembly 10 by covering one side and the other side of the electrode assembly 10 and is provided in a structure in which the upper portion 50 and lower portion 60 are connected to each other at one side. Alternatively, in some cases, the upper portion 50 and lower portion 60 may be provided in a completely separated state.

Recessed grooves 50*a* and 60*a* are formed in the upper portion 50 and the lower portion 60 of the pouch 40 to accommodate the electrode assembly 10, respectively, and each of edges 50*b* and 60*b* of the grooves 50*a* and 60*a* are formed to be flat along a circumference of the pouch 40. After the electrode assembly 10 is mounted, when the upper portion 50 and the lower portion 60 of the pouch 40 are closed, the edges 50*b* and 60*b* of the upper portion 50 and the lower portion 60 are in contact with each other, and in this state, thermal fusion is performed by applying heat and a pressure to form a sealing part.

Thus, one end of each of the leads 20*a* and 20*b* is connected to the electrode assembly 10, and the other end protrudes to the outside of the pouch 40. Here, the lead films 30 (30*a* and 30*b*) are attached to sides of the leads 20, which protrude to the outside of the pouch 40, respectively. Thus, as illustrated in FIG. 3, when the sealing is performed, each of the lead films 30 is disposed between each of the leads 20 and the pouch 40 (between the edges of the pouch), and when thermal fusion is performed, one surface of each of the lead films 30 adheres to the pouch 40, and the other side of each of the lead films 30 adheres to each of the leads 20.

Furthermore, the expansion parts 51 and 61, each of which extends by a predetermined length along a longitudinal direction of the lead 20, are formed on the pouch 40. Here, the lead film 30 is formed in a size so that the entire expansion parts 51 and 61 are accommodated therein.

In the secondary battery provided in this embodiment, a width of the expansion part 51 is less than or equal to that of the lead 20, and a width of the lead film 30 is greater than that of the lead 20. The width as used herein means a length in a direction perpendicular to the longitudinal direction of the lead.

In addition, it is preferable that a protruding length d1 of each of the expansion parts 51 and 61 from one side of the pouch 40, in which the expansion parts 51 and 61 are formed, is less than 50% of a protruding length d2 of the lead 20 from one side of the pouch 40, in which the expansion parts 51 and 61 are formed.

In more detail, it is preferable that the protruding length d1 of each of the expansion parts 51 and 61 is formed within a range of 20% to 40% of the protruding length d2 of the lead 20.

When the protruding length d1 of each of the expansion parts 51 and 61 is formed to be less than 20% of the protruding length d2 of the lead 20, there is a problem in that an effect of increasing in sealing force due to the formation of the expansion parts 51 and 61 is reduced. When the protruding length d1 exceeds 40% of the protruding length d2, an exposed area of the lead 20 is covered too much, and thus, there is a possibility of occurrence of an interference when the lead 20 is electrically connected to the external device. Therefore, it is preferable to be formed within the above range in order to compromise this state.

Therefore, when the heat and pressure are applied to the pouch 40, the heat and pressure are transferred in order of the expansion parts 51 and 61, the lead film 30, and the lead 20. As a result, the expansion parts 51 and 61 are thermally fused to the lead film 30, and the lead film 30 is thermally fused to a surface of the lead 20.

Second Embodiment

Furthermore, the present invention provides a method for manufacturing a secondary battery having the above structure as a second embodiment.

The manufacturing method according to this embodiment comprises a pouch providing process and a sealing process.

In the pouch providing process, a pouch 40, which has an inner space, in which an electrode assembly 10 is embedded, and in which sealing is performed along edges 50*b* and 60*b*, is provided. Here, each of expansion parts 51 and 61 protrudes from a position at which a lead 20 having one end connected to the electrode assembly 10 and the other end protruding to the outside is seated.

The pouch 40 is manufactured by molding and cutting a raw material of the pouch 40. Here, portions of upper and lower portions 50 and 60 of the pouch 40, in which grooves 50*a* and 60*a* are formed, are processed by being pressed by a punch to deform the raw material, and portions of the edges 50*b* and 60*b* are processed by cutting the raw material to be fitted with a predetermined size. Here, when the cutting is performed to form the edges 50*b* and 60*b* of the upper portion 50 and the lower portion 60, the expansion parts 51 and 61, each of which protrudes to a predetermined size from each of the portions of the edge 50*b* and 60*b* on which the lead 20 is placed, are processed to be provided.

Also, the sealing process comprises an accommodation process of accommodating the electrode assembly 10 in the pouch 40. In the accommodation process, when the electrode assembly 10 is embedded in the pouch 40, a portion of a lead tape 30 and an end of the lead 20 are accommodated so as to protrude to the expansion parts 51 and 61.

In addition, in the sealing process, in a state in which the edges 50*b* and 60*b* of the upper portion 50 and the lower portion 60 of the pouch 40 are in contact with each other, heat is applied to the edges 50*b* and 60*b*, which are in contact with each other, to perform the sealing.

While the edges 50*b* and 60*b* are sealed, the extension parts 51 and 61 are also sealed to be bonded to the lead 20.

Since the lead 20 is mounted in a state of being coupled to the lead film 30, when sealing of the expansion parts 51 and 61 is performed, the expansion parts 51 and 61 are thermally fused to the lead film 30 and, the lead film 30 is thermally fused to a surface of the lead 20.

The lead film 30 has an area so that the entire expansion parts 51 and 61 are accommodated therein. The lead film 30 has a width greater than that of the lead 20.

Figure 4:
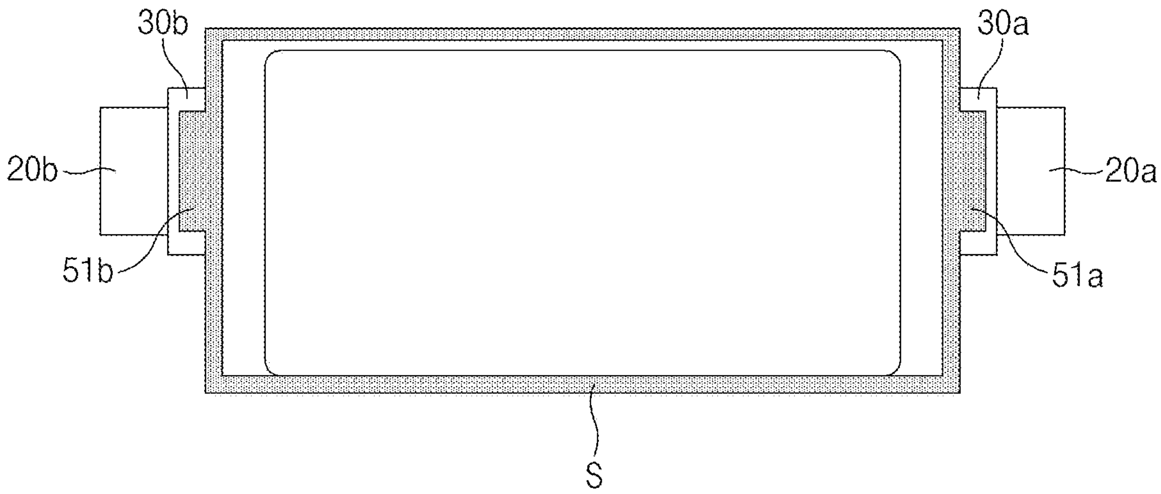
FIG. 4 is a plan view illustrating a region S in which sealing is performed in the secondary battery according to the present invention.

As illustrated in FIG. 4, in which a sealing region S is displayed in the secondary battery according to the present invention, in the present invention having the above-described configuration, the expansion parts 51 and 61 may be formed in the pouch 40, and the sealing area may increase by the areas increasing by the expansion parts 51 and 61 to more improve the sealing performance at the portion at which the lead 20 is disposed. Therefore, possibility of leakage of an electrolyte and possibility of damage of the lead may be further reduced.

The lead film 30 may be thermally fused to the extension parts 51 and 61 and the lead 20 of the pouch 40. Here, since the lead film 30 has the area and width, which are greater than those of each of the expansion parts 51 and 61, the effect of increasing in width of the sealed point may be expected.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Electrode assembly
40: Pouch
50: Upper portion of pouch
60: Lower portion of pouch
30 (30*a*, 30*b*): Lead film
51*a*, 51*b*, 61*a*, 61*b*: Expansion part

The invention claimed is:

1. A secondary battery, comprising:

an electrode assembly;

a pouch inside which the electrode assembly is contained, the pouch being sealed along an edge thereof;

a lead having a first end connected to the electrode assembly and a second end protruding through the pouch to an outside of the pouch; and a lead film disposed between the lead and the pouch, the lead film having a portion protruding to the outside of the pouch and adhering to each of the pouch and the lead at a sealing part of the pouch, wherein the pouch includes an expansion part extending beyond the sealing part by a predetermined length in a longitudinal direction of the lead, and an entire area of the expansion part overlies the portion of the lead film protruding to the outside of the pouch, such that the expansion part is entirely located within an outer boundary of the portion of the lead film.

2. The secondary battery of claim 1, wherein the expansion part is thermally fused to the lead film, and the lead film is thermally fused to a surface of the lead.

3. The secondary battery of claim 2, wherein the expansion part has a width in a lateral direction of the lead perpendicular to the longitudinal direction less than or equal to a width of the lead in the lateral direction.

4. The secondary battery of claim 3, wherein the lead film has a width in the lateral direction greater than the width of the lead in the lateral direction.

5. The secondary battery of claim 1, wherein the expansion part extends beyond the sealing part in the longitudinal direction by a first protruding length, and the lead extends beyond the sealing part in the longitudinal direction by a second protruding length, the first protruding length being less than 50% of the second protruding length.

6. A method of manufacturing a secondary battery, comprising:

providing a pouch having an inner space therein, the pouch having an electrode assembly contained therein, the pouch having a sealing part along an edge thereof, the pouch having an expansion part extending beyond the sealing part at a position at which a lead protrudes through the pouch, the lead having a first end connected to the electrode assembly and a second end protruding to an outside of the pouch; and sealing the pouch by applying heat along the edge of the pouch to seal the pouch with the electrode assembly and the lead mounted in the pouch, the sealing being performed so that the expansion part is bonded to the lead, wherein the lead is disposed on the expansion part together with a lead film having a portion protruding to the outside of the pouch, and an entire area of the expansion part overlies the portion of the lead film protruding to the outside of the pouch, such that the expansion part is entirely located within an outer boundary of the portion of the lead film.

7. The method of claim 6, wherein the expansion part is thermally fused to the lead film, and the lead film is thermally fused to a surface of the lead.

8. The method of claim 7, wherein the lead film has a width in a lateral direction of the lead perpendicular to a longitudinal direction in which the lead extends greater than a width of the lead in the lateral direction.

9. The method of claim 6, wherein the expansion part extends beyond the sealing part in a longitudinal direction in which the lead extends by a first protruding length, and the lead extends beyond the sealing part in the longitudinal direction by a second protruding length, the first protruding length being less than 50% of the second protruding length.

* * * * *